(12) United States Patent
Labarre et al.

(10) Patent No.: US 10,223,353 B1
(45) Date of Patent: Mar. 5, 2019

(54) DYNAMIC SEMANTIC ANALYSIS ON FREE-TEXT REVIEWS TO IDENTIFY SAFETY CONCERNS

(71) Applicant: Amazon Technologies, Inc., Seattle, WA (US)

(72) Inventors: Thibaut Labarre, Seattle, WA (US); Anthony H. Auffray, Issaquah, WA (US); Christopher Herzog, Seattle, WA (US); So Ihara, Shoreline, WA (US); Chance Kelch, Seattle, WA (US); David Marc Kosnoff, Sammamish, WA (US)

(73) Assignee: Amazon Technologies, Seattle, WA (US)

( * ) Notice: Subject to any disclaimer, the term of this patent is extended or adjusted under 35 U.S.C. 154(b) by 126 days.

(21) Appl. No.: 15/270,094

(22) Filed: Sep. 20, 2016

(51) Int. Cl.
| G06F 17/27 | (2006.01) |
| G06F 17/22 | (2006.01) |
| G06F 17/21 | (2006.01) |
| G06F 3/0481 | (2013.01) |
| G06F 17/30 | (2006.01) |

(52) U.S. Cl.
CPC ........ *G06F 17/2785* (2013.01); *G06F 17/218* (2013.01); *G06F 17/2247* (2013.01); *G06F 17/274* (2013.01); *G06F 3/0481* (2013.01); *G06F 17/30687* (2013.01); *G06F 17/30864* (2013.01)

(58) Field of Classification Search
None
See application file for complete search history.

(56) References Cited

U.S. PATENT DOCUMENTS

| 8,676,730 | B2* | 3/2014 | Ghani | G06N 99/005 |
| | | | | 706/12 |
| 9,665,835 | B2* | 5/2017 | Sa | G06Q 10/00 |
| 2006/0230071 | A1* | 10/2006 | Kass | G06F 17/30539 |
| 2009/0319342 | A1* | 12/2009 | Shilman | G06F 17/30864 |
| | | | | 705/7.41 |
| 2011/0035326 | A1* | 2/2011 | Sholl | G06Q 30/018 |
| | | | | 705/317 |
| 2011/0078157 | A1* | 3/2011 | Sun | G06Q 30/02 |
| | | | | 707/749 |
| 2012/0011431 | A1* | 1/2012 | Mao | G06F 17/30893 |
| | | | | 715/234 |

(Continued)

OTHER PUBLICATIONS

Fang Li et al., "Research of food safety event detection based on multiple data sources", 2015 International Conference on Cloud Computing and Big Data, pp. 213-216.*

*Primary Examiner* — Richard Z Zhu
(74) *Attorney, Agent, or Firm* — Thomas | Horstemeyer, LLP

(57) ABSTRACT

Disclosed are various embodiments for identifying safety concerns by employing dynamic semantic analysis on natural language provided in free-text reviews of products. A computing environment may encode user interface data that causes an event listener to monitor a free-text description provided in a text field in a user interface. A semantic analysis may be performed on the free-text description in real-time as the free-text description is generated. Remedial actions may be performed based on the semantics identified in the free-text description or severity levels associated with identified safety concerns.

20 Claims, 10 Drawing Sheets

(56) References Cited

U.S. PATENT DOCUMENTS

| | | | |
|---|---|---|---|
| 2014/0280618 A1* | 9/2014 | Adams | H04L 12/1895 709/206 |
| 2015/0154717 A1* | 6/2015 | Stibel | G06Q 40/12 705/30 |
| 2015/0242749 A1* | 8/2015 | Carlton | H04L 65/403 706/47 |
| 2016/0055235 A1* | 2/2016 | Zhang | G06F 17/30684 707/749 |
| 2016/0117591 A1* | 4/2016 | Naik | G06N 5/025 707/748 |
| 2017/0316421 A1* | 11/2017 | Xu | G06Q 30/00 |

* cited by examiner

```
"query": {
    "list": {
      "0": {
        "query": "palpitation \"elevated heartbeat\"~10 \"fast heart\
"~10 \"heart race\"~5 \"elevated heart rate\"~5  ((\"elevated blood\"~10 \
"high blood\"~10) -(\"sugar\")) dizzy (faint AND -(smell taste arome flavor
hint) )lightheaded \"fuzzy head\"~5 anxiety nervous \"pass out\"~5 \"black
out\"~5 jitters -(\"no jitters\") shakey jittery \"passed out\"",
        "alias": "T2-Heartrate Issue",
        "description": "T2-Heartrate Issue",
        "uid": 0
      },
      "1": {
        "id": 1,
        "alias": "T2-Choking",
        "description": "T2-Choking",
        "uid": 1,
        "query": "\"choking hazard\"~5"
      },
      "2": {
        "id": 2,
        "alias": "T1-Medical Assistance",
        "description": "T1-Medical Assistance",
        "uid": 2,
        "query": "\"had to go to the doctor\" \"seek medical treatment\" \
"get medical treatment\" \"needed to go to the doctor\" \"had to go to the
vet\" \"seek medical treatment\" \"get medical treatment\" \"needed to go to
the vet\" \"had to go to the veterinarian\" \"needed to go to the
veterinarian\" \"called medical helpline\" \"called NHS helpline\" \"sought
medical advice\""
      },
```

```
                                        Ⓐ                              500b
─────────────────────────────────────────↓──────────────────────────────/────
        "3": {
          "id": 3,
          "alias": "T1-ER",
          "description": "T1-ER",
          "uid": 3,
          "query": "(+(ICU ER ambulance\"E.R.\"\"emergency room\"\"accident and
emergency\"\"A&E\"\"intensive care\")AND(-(\"feel like\"\"considered going\")OR-
(\"almost ER\"~5)OR-(\"almost E.R.\"~5)OR-(\"almost A&E\"~5)OR-(\"almost
emergency room\"~5)OR-(\"almost accident and emergency\"~5)OR-(\"almost intensive
care\"~5)))OR(+hospitalAND(-(\"used in the\")OR-(\"almost hospital\"~8)OR-(\"want
hospital\"~8)OR-(\"hospital food\"))) AND +(anaphylaxis cramps gastrointestinal \
"stomach pain\"~5 \"abdominal pain\"~5 jitters nausea ill \"Food Poisoning\"
Diarrhea trots poop vomit dizzy lightheaded)"
        },
        "4": {
          "id": 4,
          "alias": "T2-Bleeding",
          "description": "T2-Bleeding",
          "uid": 4,
          "query": "bleed bled blood -(test \"tastes like\")"
        },
        "5": {
          "id": 5,
          "alias": "T2-Intestinal Issues",
          "description": "T2-Intestinal Issues",
          "uid": 5,
          "showDisableQueriesButton": true,
          "query": "((naseau nausea nauseated nauseous -anti )  OR  (cramps
gastrointestinal gatro \"stomach pain\"~5 \"abdominal pain\"~5 \"Food Poisoning\"
Diarrhea diarrhoea trots sick) OR (vomit vom puke spew \"throw up\" \"chucked up\
" -(tastes like)) ) AND  -((+(ICU ER ambulance\"E.R.\"\"emergency room\"\
"accident and emergency\"\"A&E\"\"intensive care\")AND(-(\"feel like\"\
"considered going\")OR-(\"almost ER\"~5)OR-(\"almost E.R.\"~5)OR-(\"almost A&E\
"~5)OR-(\"almost emergency room\"~5)OR-(\"almost accident and emergency\"~5)OR-(\
"almost intensive care\"~5)))OR(+hospitalAND(-(\"used in the\")OR-(\"almost
hospital\"~8)OR-(\"want hospital\"~8)OR-(\"hospital food\"))))"
        }
      }
```

FIG. 5B

| Severity | Alias | Description | Sample Query Data |
|---|---|---|---|
| T1 | Heartrate Issue | Heartrate Issue | palpitation, elevated heartbeat, fast heart, heart race, elevated heart rate, elevated blood, high blood, sugar, dizzy, (faint AND -(smell taste arome flavor hint)), lightheaded, fuzzy head, anxiety, nervous, pass out, black out, jitters, no jitters, shakey, jittery, passed out |
| T2 | Choking | Choking | choking hazard |
| T2 | Medical Assistance | Medical Assistance | had to go to the doctor, seek medical treatment, get medical treatment, needed to go to the doctor, had to go to the vet, seek medical treatment, get medical treatment, needed to go to the vet, had to go to the veterinarian, needed to go to the veterinarian, called medical helpline, called NHS helpline, sought medical advice |
| T1 | Emergency Room Visit | Emergency Room Visit | (+(ICU, ER, ambulance, E.R., emergency room, accident and emergency, A&E, intensive care) AND (-(feel like, considered going) OR (almost ER) OR (almost E.R.) OR (almost A&E) OR (almost emergency room) OR (almost accident and emergency) OR (almost intensive care)) OR (+hospital AND (-(used in the) OR (almost hospital) OR (want hospital) OR (hospital food))) AND +(anaphylaxis, cramps, gastrointestinal, stomach pain, abdominal pain, jitters, nausea, ill, food poisoning, diarrhea, trots, vomit, dizzy, lightheaded) |
| T2 | Bleeding | Bleeding | bleed, bled, blood, tastes metallic |
| T2 | Intestinal Issues | Intestinal Issues | ((naseau nausea nauseated nauseous -anti ) OR (cramps gastrointestinal, gastro, stomach pain, abdominal pain, food poisoning, diarrhea, diarrhoea, trots, sick) OR (vomit, vom, puke, spew, throw up, chucked up, -(tastes like)) ) AND ((+(ICU, ER, ambulance, E.R., emergency room, accident, emergency, A&E, intensive care) AND (-(feel like, considered going) OR (almost ER) OR (almost E.R.) OR (almost A&E) OR (almost emergency room) OR (almost accident and emergency) OR (almost intensive care))) OR (hospital AND (-(used in the) OR -(almost hospital) OR (want hospital) OR -(hospital food)))) |

FIG. 5C

DYNAMIC SEMANTIC ANALYSIS ON FREE-TEXT REVIEWS TO IDENTIFY SAFETY CONCERNS

BACKGROUND

Various products, such as perishable food items, create safety concerns as consumers are potentially able to become sick or injured when coming into contact with a product. For instance, a contaminated batch of fruits or vegetables may cause consumers to become ill when the fruits or vegetables are consumed. It is important to identify when a product is potentially hazardous to consumers as soon as possible.

FIELD OF THE INVENTION

This disclosure relates to artificial intelligence, computational linguistics, and natural language processing (NLP), namely performing semantic and sentiment analysis in real-time on natural language provided in a free-text description of an item.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 5A and 5B depict an example semantic analysis query employable in the networked environment of FIG. 2 to identify safety concerns in product reviews according to various embodiments of the present disclosure.

FIG. 5C depicts a table data pertaining to the example semantic analysis query of FIGS. 5A and 5B according to various embodiments of the present disclosure.

DETAILED DESCRIPTION

Figure 1:
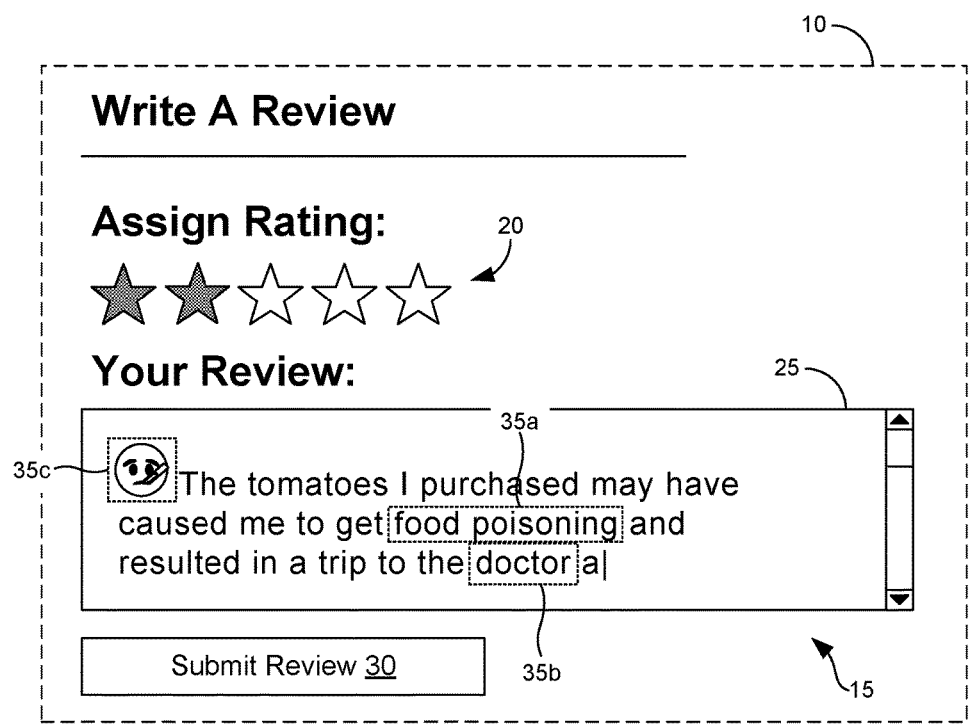
FIG. 1 is an example form for completing a product review according to various embodiments of the present disclosure.

The present disclosure relates to identifying safety concerns by employing dynamic semantic analysis on natural language provided in free-text reviews. With the emergence of logistics and electronic commerce, perishable products can be purchased online and shipped to consumers, where the consumers thereafter provide reviews describing their experience with the product. For instance, consumers may describe whether their experience with a product was positive, neutral, or negative.

Various products, such as perishable food items, create safety concerns as consumers are potentially able to become sick or injured when ingesting or otherwise coming into contact with a product. For instance, an expired or contaminated batch of fruits or vegetables may cause consumers to become ill when the fruits or vegetables are consumed. It is important to identify that a product is potentially hazardous as soon as possible. To this end, reviews provided by customers in association with a product ("product reviews") may be analyzed to identify safety concerns as the reviews are generated by the customer, thereby allowing remedial actions to be performed in a timely fashion.

According to various embodiments described herein, a computing environment may be employed to generate one or more user interfaces that receive a free-text description from a consumer in association with an item, such as a perishable food product. For instance, if a consumer indicates that he or she became ill after consuming a food product while writing a product review, the product may automatically be removed from an electronic marketplace so that additional consumers can be protected.

In one embodiment, a computing environment is employed to generate user interface data, such as network page code, for rendering on a client device. The user interface data creates an event listener on the client device configured to monitor a free-text description provided in a text field in a user interface. In various embodiments, the user interface may be generated on the client device when a user of the client device has indicated that he or she desires to provide a product review for an item, such as a food product.

After the user interface has been rendered on the client device, the event listener may identify changes in the text field as the user generates the free-text description and may communicate free-text description data to the computing environment for analysis. Such analysis may include, for example, performing a semantic analysis on the free-text description while the free-text description is generated by comparing at least one semantic obtained from the free-text description to a semantic library associated with the product or a relevant product category.

If at least one semantic obtained from the free-text description matches an entry in the semantic library, a user of the client device may be prompted to verify a safety concern that may have been detected by the computing environment. If the user verifies the safety concern, a remedial action may be automatically performed, such as removing an offering for the product from an electronic marketplace.

As user-generated text may be monitored in real-time in accordance with the embodiments described herein, any real-time monitoring of text may occur only if a user has been notified of such data collection and analysis, and only if a user has provided informed consent and permission. In addition, real-time monitoring of text may be employed only if permitted under applicable laws and regulations.

In the following discussion, a general description of a system for identifying safety concerns by employing dynamic semantic analysis on free-text reviews and its components is provided, followed by a discussion of the operation of the same.

With reference to FIG. 1, shown is a form 10 that may be generated in a user interface to obtain a product review 15 for an item purchased over a network site, such as a food product. In various embodiments, a user interface may include, for example, a network page generated in a browser application or a screen of a client application. The form 10 may include a metric rating 20, a text field 25 where a free-text description of a product can be provided, and a submit review component 30. The form 10 may include other form components to obtain a product review 15, as may be appreciated.

By interacting with the form 10, the user may provide a metric rating 20 indicating an overall satisfaction with an item, product, or service. For example, a one star review may indicate negative sentiment while a five star review indicates a positive sentiment (or vice versa). Additionally, the user may provide a free-text description to describe his or her overall satisfaction with an item, product, or service.

In various embodiments, as a user provides a free-text description in the text field 25, the content of the free-text description may be analyzed in real-time to identify safety concerns associated with the product. Analysis in real-time may include, for example, analyzing the free-text description prior to the user selecting or otherwise manipulating the submit review component 30. To this end, an event listener may be employed on a client device to identify changes made in the text field 25. When a change is identified, the current content of the free-text description, or a portion thereof, may be communicated to a remote computing device for analysis, as will be described.

The remote computing device may be employed to identify the presence of certain semantics 35a . . . 35c (collectively "semantics 35") indicative of a safety concern associated with an item. Semantics 35 may include, for example, symbols, words, characters, phrases, emoticons, or a combination thereof, that are indicative a safety concern. For instance, the term "food poisoning" (semantic 35a) may be characteristic of a safety concern for a food product, while "doctor" (semantic 35b) may indicate that the user has become sick or ill. Similarly, an emoticon (semantic 35c) used to express illness may indicate that the user has become sick or ill. Using natural language processing, meaning may be derived from the free-text description provided in the text field 25 and a safety concern can be identified with a reasonable degree of certainty.

While various examples included herein describe analyzing a free-text description as it is generated in a text field using a keyboard or similar interface, in further embodiments, the free-text description may be analyzed while it is programmatically generated by a client device 106 based on speech provided by a user. For instance, a review of an item may be provided in the form of speech captured by a device, such as a smartphone, home automation device, or other type of client device 106. A speech-to-text engine implemented on the client device 106 or in the computing environment 103 may convert the speech, captured in the form of an audio signal, to text capable of interpretation by a review analysis system and a natural language processor, as will be described.

Additionally, while the embodiments described herein include, for example, perishable food products, the disclosure is not so limited. In further embodiments, safety concerns can be identified in reviews of digital content or other types of items that may be purchased through in an electronic marketplace. For example, a review of a video game or a movie may indicate that a certain scene causes seizures. Other examples include product reviews for items indicating that the items may be choking hazards. Such embodiments are intended to be within the full scope of the disclosure. Additionally, the embodiments described herein may be employed for use in product returns or related processes.

Figure 2:
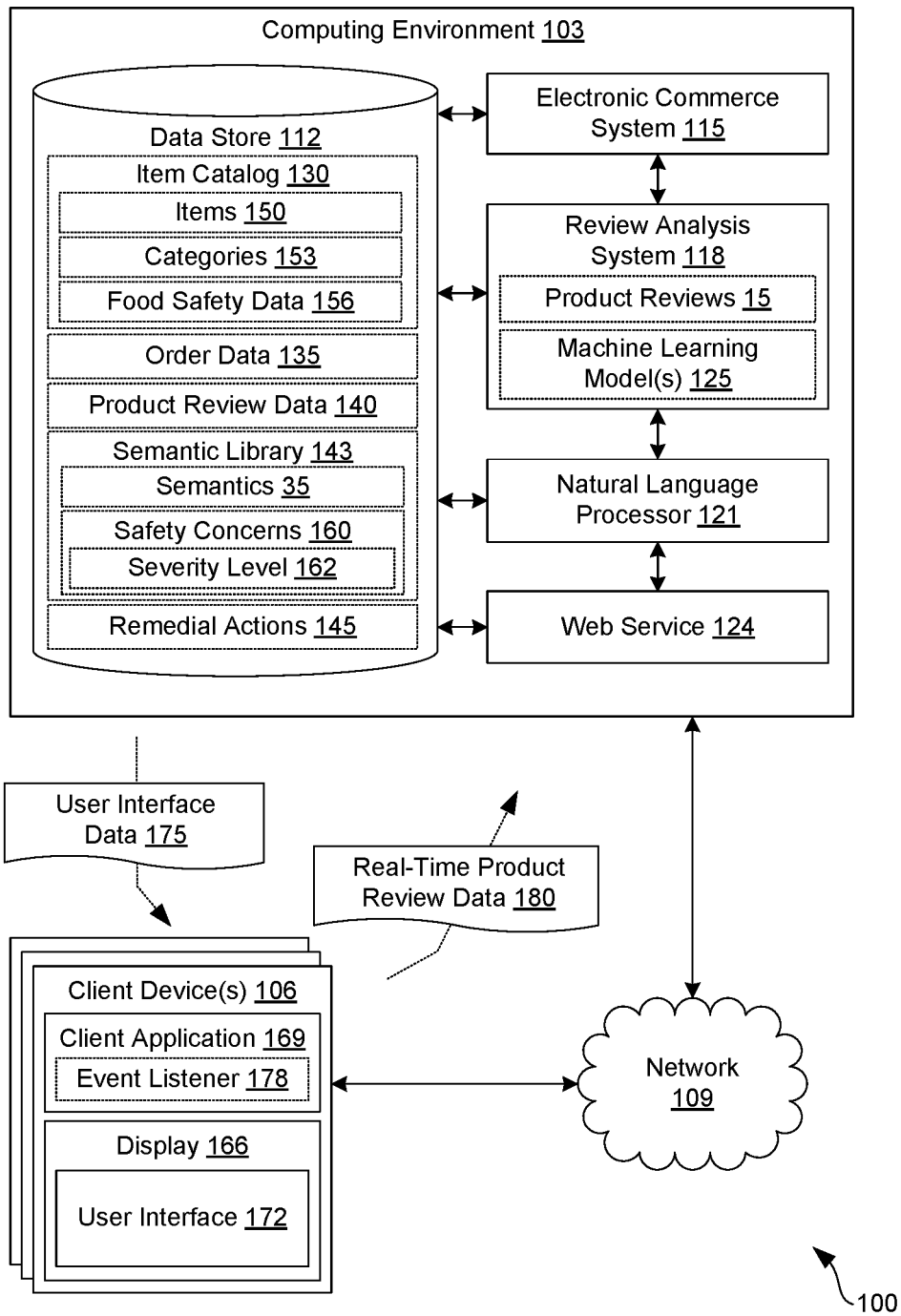
FIG. 2 is a schematic block diagram of a networked environment according to various embodiments of the present disclosure.

With reference to FIG. 2, shown is a networked environment 100 according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, or any other distributed computing arrangement. In some cases, the computing environment 103 may correspond to an elastic computing resource where the allotted capacity of processing, network, storage, or other computing-related resources may vary over time.

Various applications or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications or functional entities described below.

The components executed on the computing environment 103, for example, include an electronic commerce system 115, a review analysis system 118, a natural language processor 121, a web service 124, and other applications, services, processes, systems, engines, or functionality not discussed in detail herein.

The electronic commerce system 115 is executed to facilitate the online purchase of items, products, or services over the network 109 in an electronic marketplace. In various embodiments, the items, products, or services may include food products, such as perishable or non-perishable food products. The electronic commerce system 115 may also perform various backend functions associated with the online purchase of items, products, and services as will be described. For example, the electronic commerce system 115 may generate network pages, such as web pages, or other types of network content that are provided to client devices 106 for the purposes of selecting items for purchase, rent, download, lease, or other form of consumption as may be appreciated.

The review analysis system 118 is executed to monitor data provided in a product review in real-time as the product review is generated to identify potential safety concerns that may result from exposure to an item, product, or service. To this end, the review analysis system 118 may employ a natural language processor 121 capable of processing natural language to identify the meaning of a product review 15 programmatically. Based on a meaning of a product review 15, the review analysis system 118 may perform remedial actions, as will be discussed.

The natural language processor 121 may employ part-of-speech tagging (POST) for each semantic 35 in a given sentence, such as a symbol, character, word, emoticon, phrase, or combination thereof. For instance, the natural language processor 121 may identify verbs, nouns, adverbs, adjectives, conjunctions, or other miscellaneous content, such as emoticons. The natural language processor 121 may further identify morphological items, such as genders and numbers. Using the part-of-speech tagging, relationships between semantics 35 may be identified. Moreover, the natural language processor 121 may associate semantics 35 with various categories, such as items, item types, persons, locations, illnesses, etc.

Referring again to the review analysis system 118, one or more machine learning (ML) models 125 may be employed by the review analysis system 118 to identify safety concerns 160 or other quality-related issues from free-text descriptions. To this end, various machine learning models 125 may be employed to improve detection of safety concerns programmatically without having to explicitly define methods capable of identifying the various types of safety concerns. In some embodiments, the machine learning models 125 include models supervised by an administrator or unsupervised models.

Implementing a machine learning model 125 may include, for example, generating a score, metric, or other statistical inference about whether a free-text description includes a potential safety concern or other quality-related issue concerning an item. In one example, Bayesian learning is employed to perform a statistical inference where a probability metric is generated indicative of whether a free-text description includes a safety concern. Using Bayesian learning, as more safety concerns are verified, the machine learning model 125 is updated to improve detection of safety concerns while lessening detecting of false positives. As may be appreciated, Bayes' Theorem may be employed in Bayesian learning.

In various embodiments, a probability that a free-text description includes a safety concern (or other quality-related issue) may be derived from:

$$h(x) = \theta_0 + \theta_1 x \ldots \theta_n x \quad \text{(eq. 1)},$$

where h(x) is a predictor metric describing whether a free-text description includes a potential safety concern and θ represents a weight corresponding to each semantic 35 identified in the free-text description and the potential safety concern being identified. When a probability a safety concern has been identified exceeds a threshold, the potential safety concern may be provided to the user (or an administrator) for verification. In response to a verification of the safety concern, the weights corresponding to each semantic 35 and safety concern may be updated to improve future determinations, as may be appreciated.

The web service 124 is executed to provide a medium for communication between the components of the computing environment 103 and the client devices 106 over the network 109. The web service 124 may comprise a web-based application programming interface (API) embodied in software that facilitates programmatic service calls, such as API calls, made by the client device 106 to communicate with the components of the computing environment 103, such as the electronic commerce system 115, the review analysis system 118, the natural language processor 121, the data store 112, or other services or applications not described herein.

According to various embodiments, the web-based API may further comprise a representational state transfer (REST) API, a simple object access protocol (SOAP) API, a hypertext transfer protocol (HTTP) API, or another suitable API.

The data stored in the data store 112 includes, for example, an item catalog 130, order data 135, product review data 140, a semantic library 143, remedial actions 145, and potentially other data. The item catalog 130 may include data regarding items 150 offered for sale or other form of consumption by merchants in an electronic marketplace provided through the electronic commerce system 115. In some embodiments, items 150 include food products, such as vegetables, fruit, dairy, meat, grains, a combination thereof, or other similar type of food product, whether perishable or non-perishable. The item catalog 130 may include many fields of data regarding each item 150, such as, but not limited to, title, category 153, description, brand, keywords, price, weight, shipping methods, images, similar items 150, offering merchants, stock number, unique identifiers, food safety data 156, purchase data, view data, item attributes, etc.

A category 153 may describe various types of items 150. For instance, a tomato may be associated with the "fresh produce" and "vegetable" categories 153, while 2% milk may be associated with the "fresh produce" and "dairy" categories 153. Food safety data 156 may include, for example, ingredients, allergies, preparation instructions, storage requirements, expiration dates, common side effects, common illnesses, or other information, such as information may that may be readily available on a label for an item 150. To this end, the item catalog 130 may be accessed to determine whether an effect a customer is experiencing is expected given a category 153 or type of the product.

Order data 135 may include data pertaining to one or more orders for items 150 in the item catalog 130 generated through the electronic commerce system 115. Order data 135 may include, for example, data indicating a user account that made a purchase for one or more food products. Product review data 140 may include data pertaining to one or more product reviews 15.

The semantic library 143 may include semantics 35 indicative of one or more safety concerns 160. As semantics 35 may include, for example, symbols, words, characters, phrases, emoticons, or a combination thereof, that are indicative a safety concern 160, the semantic library 143 may include medical terms, medical diagnoses, symptoms, slang terms, emoticons commonly used to indicate that a person is sick, or similar information. Additionally, the semantic library 143 may include semantics 35 associated with a quality of an item 150. For instance, the semantic library 143 may include semantics 35 that identify appearance, smell, or taste of an item 150.

The semantic library 143 may also include safety concerns 160 that may correspond to one or more semantics 35. Each of the safety concerns 160 may be associated with a severity level 162 that may be used in determining an appropriate remedial action 145 to perform. For instance, an item 150 having an unpleasant appearance while safe to consume may be associated with a severity level 162 lower than that of an item 150 being unsafe to consume. Hence, different remedial actions 145 may be performed in accordance with the severity levels 162. Remedial actions 145 are predetermined actions that may be performed by the computing environment 103 in response to semantics 35 identified in one or more product reviews 15 rising to an actionable level, as will be described. The semantic library 145 may also include common misspellings as well as words or phrases in various languages.

The client device 106 is representative of a plurality of client devices 106 that may be coupled to the network 109. The client device 106 may comprise, for example, a processor-based system such as a computer system. Such a computer system may be embodied in the form of a desktop computer, a laptop computer, personal digital assistant, cellular telephone, smartphone, set-top box, music player, web pad, tablet computer system, game console, electronic book reader, home automation device, or other devices with like capability. The client device 106 may include a display 166. The display 166 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 169 or other applications. The client application 169 may be executed in a client device 106, for example, to access network content served up by the computing environment 103 or other servers, thereby rendering a user interface 172 on the display 166. To this end, the client application 169 may comprise, for example, a browser application, a dedicated application, etc., and the user interface 172 may comprise a network page, an application screen, etc. The client device 106 may be configured to execute applications beyond the client application 169 such as, for example, email applications, social networking applications, word processors, spreadsheets, or other applications.

Next, a general description of the operation of the various components of the networked environment 100 is provided. To begin, it is assumed that users of the electronic commerce system 115 generate orders for items 150 offered for purchase in an electronic marketplace or other marketplace, such as a brick-and-mortar store. In some examples, each item 150 may be associated with one or more safety concerns 160 capable of being detected in product reviews 15. In some embodiments, the safety concerns 160 or other quality-related issues may be predetermined and stored in the data store 112 by merchants, administrators of the electronic commerce system 115, or extrapolated from food safety data 156. In further embodiments, machine learning may be employed to identify new safety concerns 160 as they surface through product reviews 15, as will be discussed.

To collect data from a product review 15 in real-time, the computing environment 103 may be employed to encode or otherwise generate user interface data 175 that, when rendered by a client device 106, includes a form 10 that allows a user of the client device 106 to generate a product review 15 for an item 150. In one embodiment, the computing environment 103 generates a hypertext markup language (HTML) document capable of being rendered by a browser application executed on a client device 106.

The user interface data 175 may be encoded by the computing environment 103 to include an event listener 178 that monitors changes to the form 10 or its components as they occur in real-time on the client device 106. For example, in embodiments where a user interface 172 rendered on a client device 106 includes a network page, the event listener 178 may be implemented using javascript, jQuery javascript, asynchronous javascript and extensible markup language (AJAX), dynamic HTML (DHTML), or similar technology.

The event listener 178 may periodically inspect components of the form 10, such as the text field 25, at predefined durations to determine whether a change in the form 10 has occurred. Alternatively, the event listener 178 may inspect components of the form 10 in response to predefined events having occurred. For example, the .keystroke( ) method in the jQuery library may be employed to identify changes in the text field 25 or other component of the form 10 where a free-text description may be provided.

If a change to the text field 25 has been identified, the contents of the text field 25, or other appropriate portion of the form 10, may be communicated to the computing environment 103 for analysis as real-time product review data 180. To this end, using AJAX or similar medium, the content of the text field 25 may be communicated to the computing environment 103 prior to submission of the form 10 and without a refresh of the network page being required. To prevent transmissions at every keystroke or similar event, the event listener 178 may only communicate real-time product review data 180 to the computing environment 103 after a threshold number of events have been identified or after a predetermined amount of time.

Once received by the computing environment 103, the free-text description of the form 10 may be analyzed in association with an item 150, such as a perishable food product to identify a quality-related issue associated with an item, such as a safety concern 160. To this end, the review analysis system 118 may perform a semantic analysis on the free-text description of the product review 15 by comparing at least one semantic 35 obtained from the free-text description to the semantic library 143 and determining whether a remedial action 145 requires performance.

In some situations, a safety concern 160 may be identified that is expected given a category 153 of the item 150 purchased. For example, if a user indicates that he or she is "jittery" or "alert" after drinking a caffeinated- or coffee-based product, it is assumed that no remedial actions 145 require performance as jitteriness or alertness are expected given the nature of caffeinated- and coffee-based products.

In some scenarios, the natural language processor 121 may not be able to derive an exact meaning from a product review 15. For instance, if at least one semantic 35 obtained from the free-text description matches an entry in the semantic library 143, a user of the client device 106 may be prompted to verify or confirm a safety concern 160 that may have been automatically detected by the computing environment 103. For example, if the user has used the semantic 35 of "food poisoning," the user may be prompted to indicate whether the user (or other being) has acquired food poisoning through contact with the item 150.

If a safety concern 160 has been identified from a product review 15 that is unexpected given the nature of the product, a remedial action 145 may be identified and automatically performed based on the safety concern 160 identified. In various examples, remedial actions 145 may include, for example, removing an offering for the product from an electronic marketplace managed by the electronic commerce system 115, requesting additional information from a merchant seller of the item 150, or other similar action. Removing an offering for an item 150 or product may include, for example, removing all offerings for the items 150 in the electronic marketplace or, in other embodiments, removing only items 150 sold by a particular merchant. Additionally, removing an offering for an item 150 may include, for example, removing items 150 associated with a particular batch.

As user-generated text may be monitored in real-time in accordance with the embodiments described herein, any real-time monitoring of text may occur only if a user has been notified of such data collection and analysis, and only if a user has provided informed consent and permission. Such consent may be obtained by providing a user with a dialog or other user interface component that indicates the nature of the data collected as well as obtains the users consent to collect such data.

Figure 3:
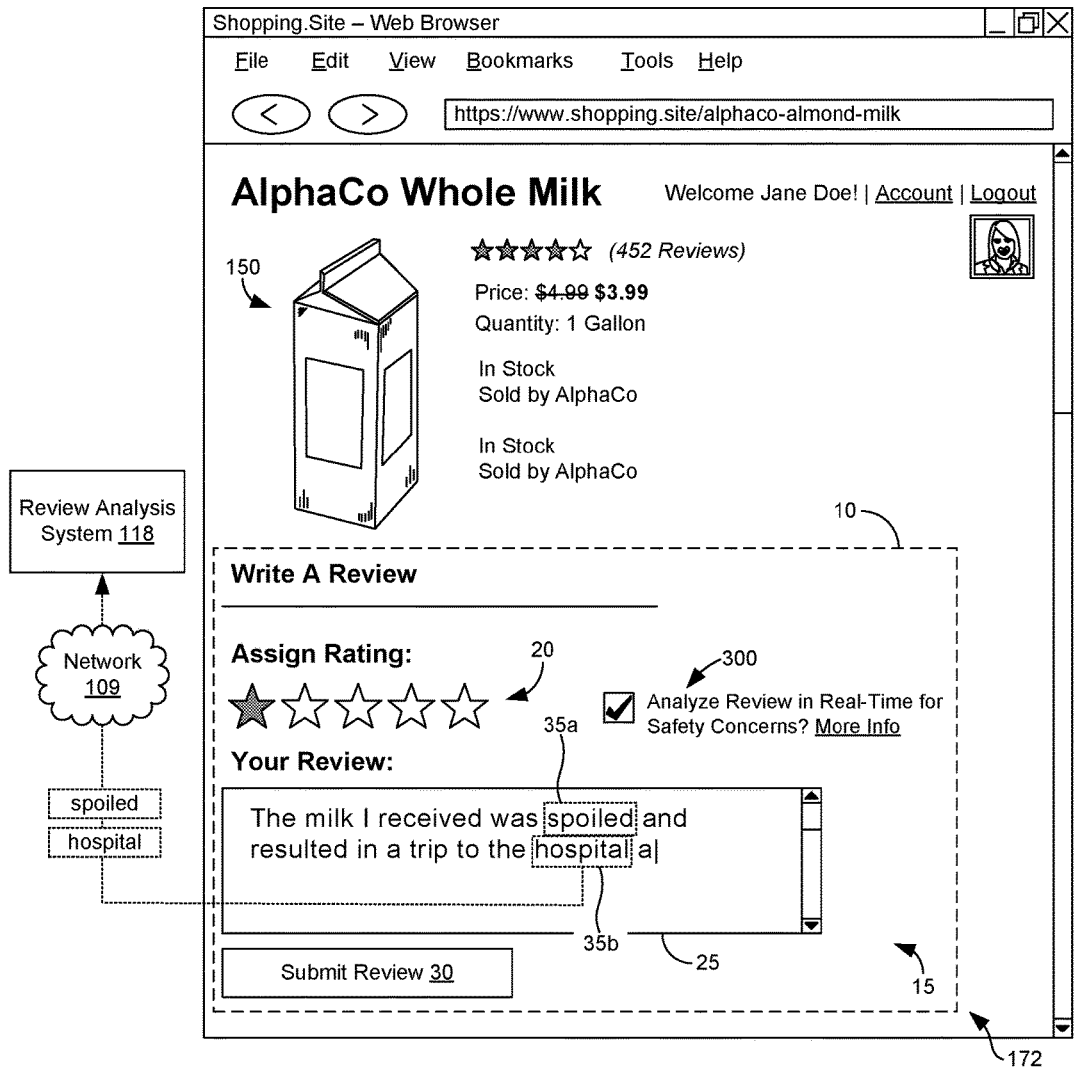
FIGS. 3 and 4 are example user interfaces rendered by a client device in the networked environment of FIG. 2 to obtain a product review from a user according to various embodiments of the present disclosure.

Turning now to FIG. 3, shown is an example of a user interface 172 that may be rendered on a client device 106 to create a product review 15 in association with an item 150. In the non-limiting example of FIG. 3, the user interface 172 includes a form 10 configured to obtain a product review 15 for a food product. The form 10 includes, for example, a metric rating 20, a text field 25, a submit review component 30, and a permission component 300 configured to obtain informed consent from a user regarding real-time collection of data. As may be appreciated, the form 10 may include other components not included in FIG. 3.

Using a suitable input device on the client device 106, a user may interact with the form 10 to provide a product review 15. For example, the user may provide a metric rating 20 indicating an overall satisfaction with an item 150, product, or service. Additionally, the user may provide a free-text description in the text field 25 to describe his or her overall satisfaction with an item 150, product, or service. As the free-text description is provided, the content of the free-text description may be analyzed in real-time to identify safety concerns 160 associated with the item 150.

For example, an event listener 178 may communicate the contents of the text field 25 to the computing environment 103 to analyze the free-text description prior to the user manually selecting or otherwise manipulating the submit review component 30. In one example, the event listener 178 uses AJAX to send the contents of the text field 25 to the computing environment 103 in a javascript object notation (JSON) or extensible markup language (XML) data format.

The review analysis system 118 (as well as the natural language processor 121) may be employed to identify the presence of certain semantics 35a ... 35b indicative of a safety concern 160 associated with an item 150. For example, the term "spoiled" (semantic 35a) may be characteristic of spoiled milk while "hospital" (semantic 35b) may indicate that the user has become sick or ill. The review analysis system 118 may derive meaning from the free-text description provided in the text field 25 and one or more safety concerns 160 may be identified. The permission component 300 may allow a user to toggle whether user-generated text is monitored in real-time in accordance with the embodiments described herein.

Figure 4:
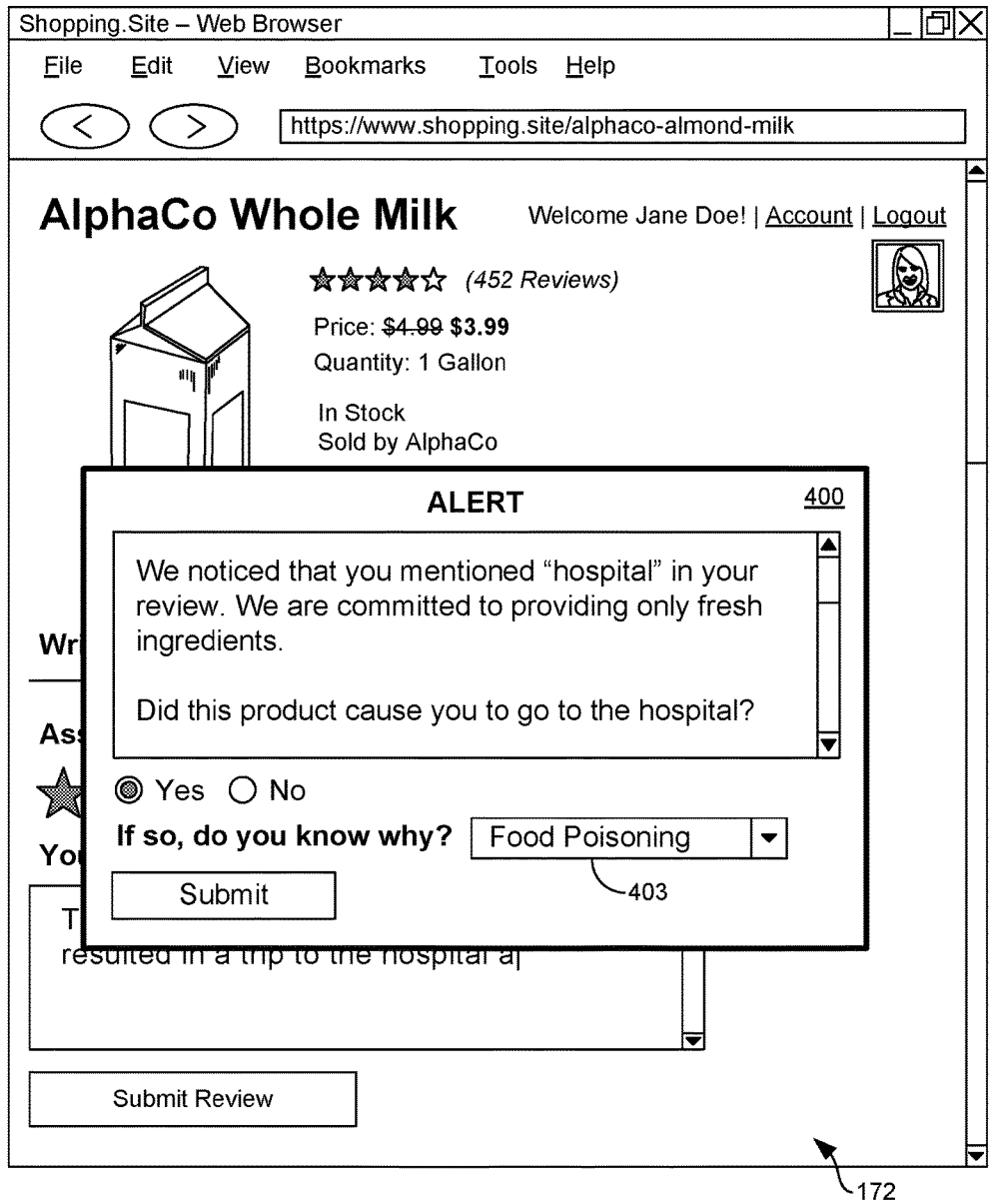

Moving on to FIG. 4, shown is another example of a user interface 172 that may be rendered on a client device 106 to create a product review 15 in association with an item 150. In some scenarios, the natural language processor 121 may not be able to derive an exact meaning from a product review 15. For instance, if at least one semantic 35 obtained from the free-text description matches an entry in the semantic library 143, a user of the client device 106 may be prompted to verify a safety concern 160 that may have been detected by the computing environment 103. For example, if the user has used the semantic 35 of "hospital," as shown in FIG. 3, the user may be prompted with a dialog 400 to indicate whether the user (or other being) had to go to the hospital as a result of contact with the item 150.

Additional information can also be obtained from the user at this time. For example, if unable to be derived from the free-text description, the dialog 400 may request the user to provide the reason of their trip to the hospital via a drop-down component 403. This information may be used in identifying a remedial action 145 to be performed, as may be appreciated. In further embodiments, the dialog 400 may include information about which remedial action 145 will be performed automatically as a result of the product review 45. For instance, the user may be notified if he or she will receive a refund, or the user may be notified that the item 150 will be removed from the electronic marketplace.

Turning now to FIGS. 5A and 5B, a query 500a ... 500b is shown in a data JSON format that may be employed to identify safety concerns 160 in a product review 15. For instance, the semantics 35 of "palpitation," "elevated heartbeat," "fast heart," or similar type of semantic 35, may be identified in product reviews 50 that are indicative of a "Heartrate Issue," which may be a safety concern 160. In various embodiments, the safety concerns 160 may be associated with different severity levels 162 that may affect the remedial action 145 performed. For instance, a safety concern 160 of a "Heartrate Issue" may be associated with a severity level 162 of Tier 2 ("T2") while the safety concern 160 of "Medical Assistance" may be associated with a severity level 162 of Tier 1 ("T1"), where Tier 1 is more severe than Tier 2. The remedial action 145 performed may vary on the severity level 162, as may be appreciated. For instance, when a safety concern 160 associated with a high severity level 162 is identified, the item 150 may be automatically removed from the electronic marketplace. On the other hand, when a safety concern 160 associated with a lower severity level 162 is identified, a merchant of the item 150 may be notified and additional information pertaining to the safety of the item 150 may be requested.

Also shown in FIGS. 5A and 5B, the semantics 35 of "had to go to the doctor," "seek medical treatment," "needed to go to the doctor," or similar type of semantic 35 may be identified in product reviews 50 that are indicative of a "Medical Assistance" issue, which also may be a safety concern 160. In various embodiments, a remedial action 145 may include updating a product page for an item 150 to include information pertaining to side effects or other safety concerns 160 experienced by customers of the electronic marketplace. A table having data used to generate the query 500a ... 500b of FIGS. 5A and 5B for performing semantic analysis is shown in FIG. 5C.

Figure 6:
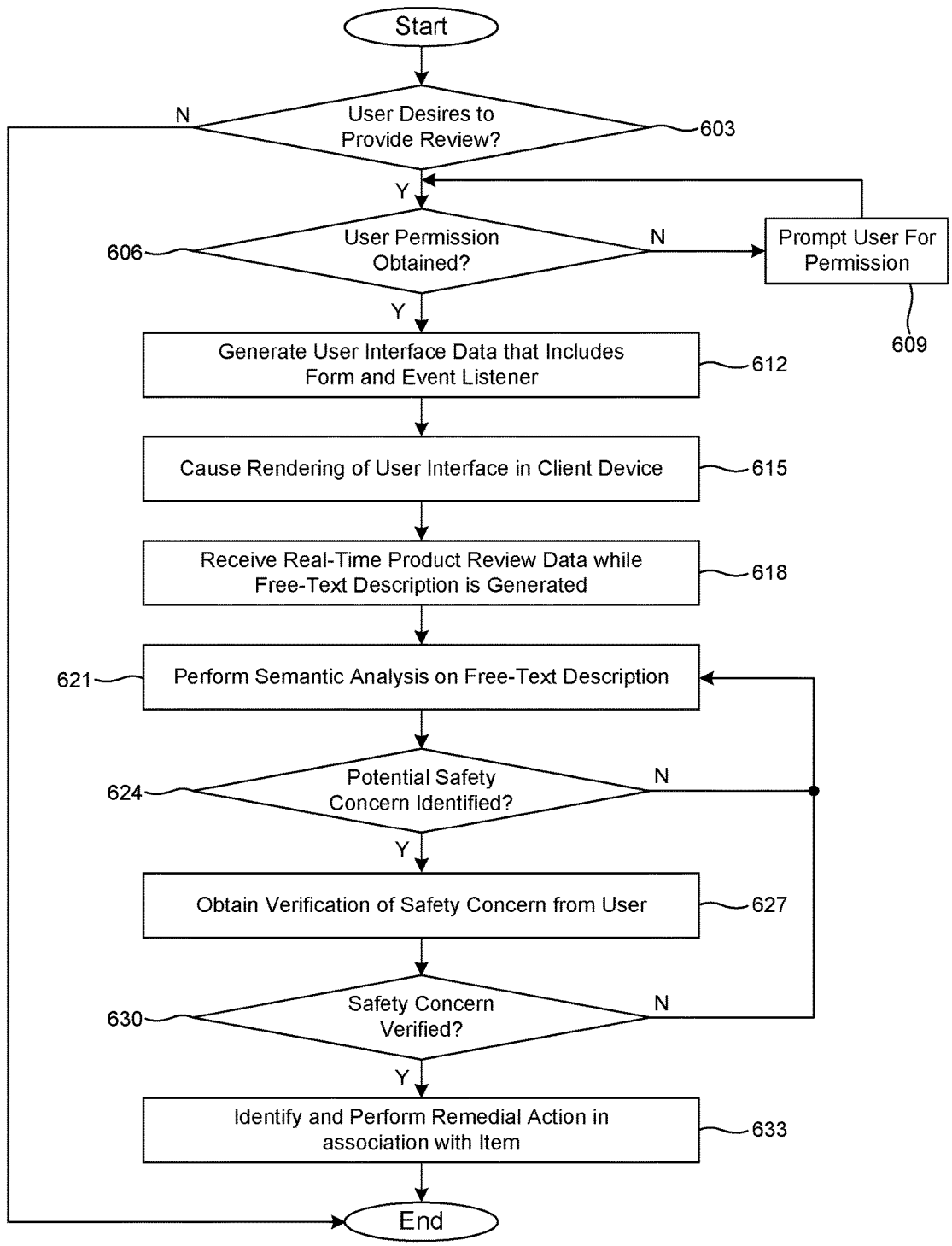
FIGS. 6 and 7 are flowcharts illustrating example functionality implemented by a review analysis system executed in a computing environment in the networked environment of FIG. 2 according to various embodiments of the present disclosure.

Referring next to FIG. 6, shown is a flowchart that provides one example of the operation of the review analysis system 118 according to various embodiments. It is understood that the flowchart of FIG. 6 provides merely an example of the many different types of functional arrangements that may be employed by the review analysis system 118 as described herein. As an alternative, the flowchart of FIG. 6 may be viewed as depicting an example of elements of a method implemented in the computing environment 103 according to one or more embodiments.

To begin, it is assumed that users of the electronic commerce system 115 generate orders for items 150 offered for purchase in an electronic marketplace. The computing environment 103 may maintain safety concerns 160 in the data store 112 in association with items 150 or categories 153 of items 150. Additionally, the computing environment 103 may maintain a semantic library 143 that includes semantics 35 indicative of a safety concern 160 and capable of being identified programmatically in the product reviews 15.

Starting with 603, a determination may be made whether a user desires to provide a product review 15. If the user does not desire to provide a product review 15, the process may proceed to completion. Alternatively, if the user desires to provide a product review 15, the process may proceed to 606 where a determination is made whether permission to collect data in real-time has been obtained from the user. For example, the permission component 300 may be toggled by the user to indicate whether the user has consented to the real-time monitoring of data provided by the user. If suitable permission has not be obtained from the user, the process may proceed to 609 where the user may be prompted or otherwise requested to provide permission to collect real-time data. Thereafter, the process may revert to 606.

Assuming the user has provided suitable permission for the real-time collection of data, the process may proceed to 612. In 612, the computing environment 103 may generate user interface data 175 that, when rendered by the client device 106, includes a form 10 that allows a user of the client device 106 to generate a product review 15 for an item 150. In one embodiment, the computing environment 103 generates an HTML document capable of being rendered by a browser application executable on a client device 106. In another embodiment, the computing environment 103 generates data that causes a particular user interface 172 to be shown in a dedicated application, such as a mobile application or a desktop application.

The user interface data 175 may be encoded by the computing environment 103 to include an event listener 178 that monitors changes to the form 10 or its components as they occur in real-time on the client device 106. For example, in embodiments where a user interface 172 rendered on a client device 106 includes a network page, the event listener 178 may be implemented using javascript, jQuery javascript, AJAX, DHTML, or similar technology. Thereafter, in 615, the computing environment 103 may cause a rendering of a user interface 172 in the display 166 of the client device 106 by sending the user interface data 175 over the network 109.

Next, in 618, real-time product review data 180 is received by the computing environment 103, for example, as the free-text description is generated in the text field 25 or other component of the form 10. In one embodiment, the event listener 178 may periodically inspect components of the form 10, such as the text field 25, at predefined durations to determine whether a change in the form 10 has occurred. Alternatively, the event listener 178 may inspect components of the form 10 in response to predefined events having occurred, such as a keystroke event detectable using the .keystroke( ) method.

In various embodiments, the contents of the text field 25 may be communicated to the computing environment 103 prior to submission of the form 10 and without a refresh of the network page being required using AJAX or similar medium. To prevent transmissions at every keystroke or similar event, the event listener 178 may only communicate real-time product review data 180 to the computing environment 103 after a threshold number of events have been identified or after a predetermined amount of time.

In 621, semantic analysis may be performed on the real-time product review data 180 that includes, for example, a free-text description obtained from the text field 25. In some embodiments, the free-text description may be analyzed in association with an item 150, such as a perishable food product. The semantic analysis may include comparing at least one semantic 35 obtained from the free-text description to the semantic library 143 and identifying a safety concern 160 associated with the semantic 35. For instance, the semantic 35 of "dizzy" or "faint" occurring in the free-text description may be indicative of a safety concern 160, such as a food allergy or a heartrate issue.

In 624, a determination is made whether a potential safety concern 160 has been identified in the product review 15. If no safety concern 160 has been identified, the process may revert to 621. Alternatively, if a safety concern 160 has been identified, the process may proceed to 627. In 627, a user of the client device 106 may be prompted to verify the potential safety concern 160 that may have been detected by the computing environment 103. For example, if the user has used the semantic 35 of "food poisoning," the user may be prompted to indicate whether the user (or other being) has acquired food poisoning through contact with the item 150. This may occur in situations where the natural language processor 121 may not be able to derive an exact meaning from the free-text description or, alternatively, in instances where verification may be ideal.

In 630, a determination is made whether the safety concern 160 identified by the review analysis system 118 has been verified by the user. If the user has not verified the safety concern 160, the process may revert to 621 and continue as described. Alternatively, if the user has verified the safety concern 160 identified by the review analysis system 118, the process may proceed to 633.

In 633, a remedial action 145 is performed in association with the item 150. In various examples, remedial actions 145 may include, for example, removing an offering for the product from an electronic marketplace managed by the electronic commerce system 115, requesting additional information from a merchant seller of the item 150, or other similar action. Removing an offering for an item 150 or product may include, for example, removing all offerings for the items 150 in the electronic marketplace or, in other embodiments, removing only items 150 sold by a particular merchant. Additionally, removing an offering for an item 150 may include, for example, removing items 150 associated with a corresponding batch. Requesting additional information from a merchant may include, for example, automatically requesting trial results or U.S. Food and Drug Administration documentation. Thereafter, the process may proceed to completion.

In further embodiments, a report may be generated that includes individual product reviews 15 that have identified safety concerns 160. For instance, the report may be provided to a manufacturer or a vendor of an item 150 offered through the electronic marketplace, such that the manufacturer or the vendor can identify common side effects or reactions to their items 150.

Figure 7:
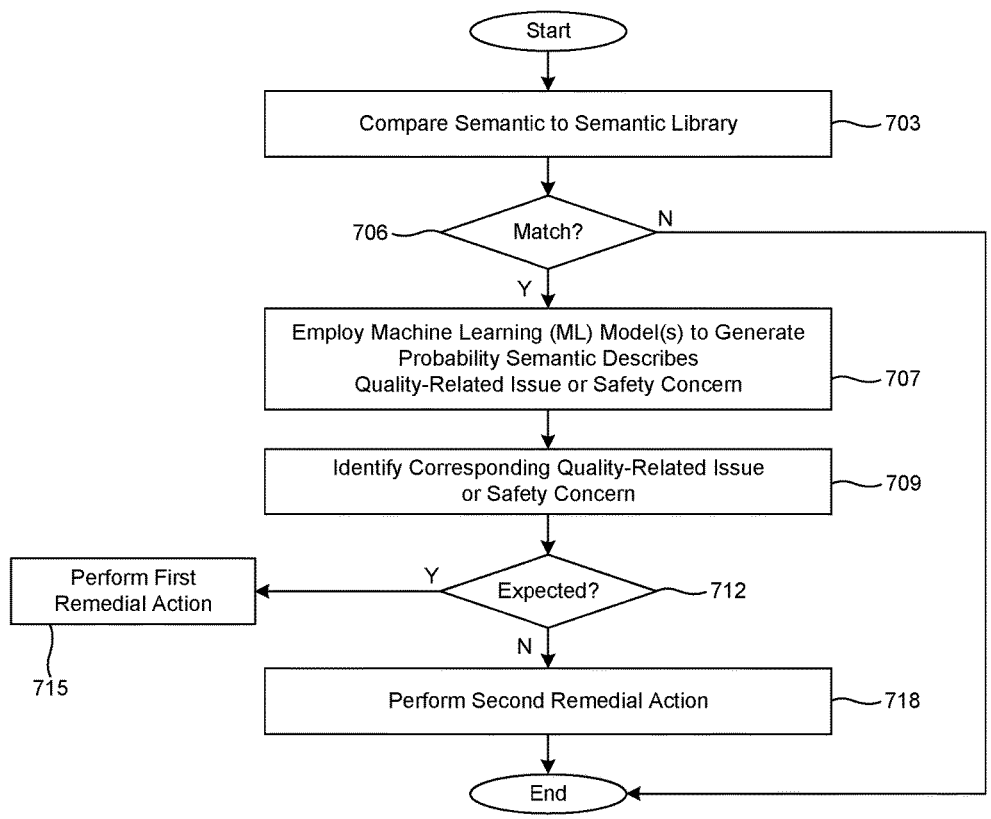

Moving on to FIG. 7, shown is a flowchart that provides one example of the operation of the review analysis system 118 according to various embodiments. It is understood that the flowchart of FIG. 7 provides merely an example of the many different types of functional arrangements that may be employed by the review analysis system 118 as described herein. As an alternative, the flowchart of FIG. 7 may be viewed as depicting an example of elements of a method implemented in the computing environment 103 according to one or more embodiments.

Starting with 703, a semantic 35 identified in a product review 15 may be compared to the semantic library 143. For instance, a semantic 35 identified in a free-text description may be used to query to the data store 112 to determine whether a match is located in the semantic library 143. Hence, in 706, a determination is made whether a match of a semantic 35 is located in the semantic library 143. If no match is identified, the process may proceed to completion.

Alternatively, if a match of a semantic 35 has been identified in the semantic library 143, the process may proceed to 707.

In 707, a machine learning model 125 may be employed to generate a probability a semantic 35 (or collection of semantics 35) identifies a quality-related issue or a safety concern. Employing a machine learning model 125 may include, for example, generating a score, metric, or other statistical inference about whether a free-text description includes a quality-related issue concerning an item. For example, a probability metric may be generated indicative of whether a semantic 35 (or collection of semantics 35) identified in a free-text description is descriptive of a quality-related issue. When a probability a quality-related issue, such as a safety concern 160, has been identified exceeds a threshold, the process may proceed to 709.

In 709, a safety concern 160 or other quality-related issue corresponding to the semantic 35 may be identified. For instance, the semantic 35 of "spoiled" or "rotten" may be indicative of the item 150 having expired. In some situations, a safety concern 160 may be identified that is expected given a category 153 of the item 150 purchased. For example, if a user indicates that he or she is "jittery" or has "shaky hands" after consuming a weight loss product, the safety concerns 160 are expected given the nature of the product.

Hence, in 712, a determination is made whether the safety concern 160 corresponding to the semantic 35 is expected. The determination may be based at least in part on a category 153 of the item 150 as well as food safety data 156 which may include ingredients, allergies, preparation instructions, storage requirements, expiration dates, common side effects, common illnesses, label information, or other related information. For example, if a user reports having a gluten-related allergic reaction after consuming a product that does not include gluten or a mentioning of gluten in the food safety data 156, then a remedial action 145 may be performed to verify whether the product includes gluten and, if so, ensure that a product page or a label for the item 150 includes information pertaining to gluten.

If the identified safety concern 160 is expected, then the process may proceed to 715 where a first remedial action 145 may be performed, if necessary. As the safety concern 160 is expected, the first remedial action 145 may include, for example, notifying the user generating the product review 15 that the safety concern 160 is expected given a particular feature or ingredient of the item 150.

Alternatively, if the safety concern 160 identified is unexpected, the process may proceed to 718 where a second remedial action 145 is performed. As may be appreciated, the second remedial action 145 may be different than the first remedial action 145 and may include an action more appropriate to respond to an unexpected safety concern 160. For instance, an offering for the item 150 may be automatically removed from an electronic marketplace managed by the electronic commerce system 115. Thereafter, the process may proceed to completion.

Figure 8:
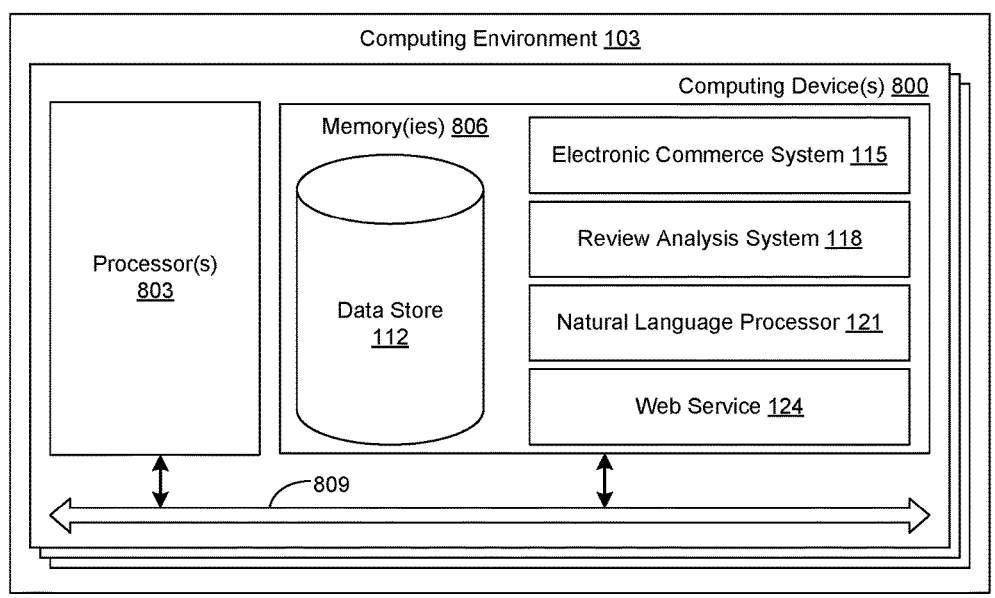
FIG. 8 is a schematic block diagram illustrating an example illustration of a computing environment employed in the networked environment of FIG. 2 according to various embodiments of the present disclosure.

With reference to FIG. 8, shown is a schematic block diagram of the computing environment 103 according to an embodiment of the present disclosure. The computing environment 103 includes one or more of the computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the electronic commerce system 115, the review analysis system 118, the natural language processor 121, the web service 124, and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the electronic commerce system 115, the review analysis system 118, the natural language processor 121, the web service 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the electronic commerce system 115, the review analysis system 118, the natural language processor 121, and the web service 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115, the review analysis system 118, the natural language processor 121, and the web service 124, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 115, the review analysis system 118, the natural language processor 121, and the web service 124, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included within the scope of this disclosure and protected by the following claims.

Therefore, the following is claimed:

1. A system, comprising:
   at least one computing device; and
   program instructions executable in the at least one computing device that, when executed, cause the at least one computing device to at least:
   perform a semantic analysis on a free-text description of an item in real-time as the free-text description is provided in a field of a form on a client device;
   determine a probability that at least one semantic identified from the free-text description corresponds to a quality-related issue stored in a data store in association with the at least one semantic;
   in response to the probability that the at least one semantic obtained from the free-text description corresponds to the quality-related issue, identify a predetermined action to be performed in association with the item based at least in part on a severity level associated with the quality-related issue; and cause performance of the predetermined action in response to the severity level exceeding a severity level threshold.

2. The system of claim 1, wherein the quality-related issue comprises a safety concern.

3. The system of claim 2, wherein the safety concern is stored in the data store in association with the severity level.

4. The system of claim 3, wherein the predetermined action is a remedial action selected based at least in part on the severity level.

5. The system of claim 1, wherein the at least one semantic comprises at least one of: a symbol, a word, a character, a phrase, an emoticon, or a combination thereof.

6. The system of claim 1, further comprising program instructions that, when executed, cause the at least one computing device to at least prompt a user of the client device to provide a confirmation of the quality-related issue.

7. The system of claim 1, wherein the program instructions that, when executed, cause the at least one computing device to identify the predetermined action to be performed in association with the item further comprise program instructions that, when executed, cause the at least one computing device to at least determine whether the quality-related issue identified from the free-text description is expected based at least in part on a category associated with the item or safety information associated with the item.

8. The system of claim 1, further comprising program instructions that, when executed, cause the at least one computing device to at least verify that a user account associated with the client device has purchased the item.

9. The system of claim 1, wherein the item is a perishable food product or a non-perishable food product.

10. The system of claim 1, wherein the program instructions that, when executed, cause the at least one computing device to perform the semantic analysis further comprise program instructions that, when executed, cause the at least one computing device to at least perform part-of-speech tagging (POST) in at least one sentence identified in the free-text description.

11. The system of claim 1, wherein the program instructions that, when executed, cause the at least one computing device to perform the semantic analysis on the free-text description in real-time as the free-text description is generated on the client device further comprise program instructions that, when executed, cause the at least one computing device to at least:

generate user interface data for rendering a user interface on a client device, the user interface data comprising code that generates an event listener when the user interface is rendered on the client device that monitors a free-text description in real-time as the free-text description is provided in the field of the form in the user interface, wherein the user interface is associated with a product review for a product; and perform the semantic analysis prior to a manual submission of the form comprising the free-text description, wherein the free-text description is provided to the at least one computing device by the event listener.

12. A computer-implemented method, comprising:

generating, by at least one computing device comprising at least one hardware processor, user interface data for rendering a user interface on a client device, the user interface data comprising code that causes a client application to execute an event listener when the user interface is rendered on the client device, the event listener being configured to monitor a free-text description in real-time as the free-text description is provided in a field of the user interface;

accessing, by the at least one computing device, a natural language processor to perform a semantic analysis of a free-text description of a food product in real-time as the free-text description is generated on a client device;

identifying, by the at least one computing device, a safety concern related to the food product as a result of the semantic analysis;

in response to the safety concern related to the food product being identified, determining, by the at least one computing device, a severity level for the safety concern based at least in part on the safety concern not being expected based at least in part on a category of the food product; and in response to the severity level determined for the safety concern exceeding a severity level threshold, performing, by the at least one computing device, a remedial action.

13. The computer-implemented method of claim 12, wherein the remedial action comprises at least one of: removing an offering for the food product from an electronic marketplace, requesting additional information from a merchant associated with the food product, and updating a product page for the food product to include information pertaining to the safety concern.

14. The computer-implemented method of claim 13, wherein removing the offering for the food product from the electronic marketplace further comprises at least one of:

removing all offerings for the food product from the electronic marketplace;

removing the offering for the food product sold by the merchant; or removing all offerings of the food product associated with an identified batch.

15. The computer-implemented method of claim 12, further comprising obtaining, by the at least one computing device, a user confirmation of the safety concern from the client device in response to the safety concern related to the food product being identified.

16. The computer-implemented method of claim 12, wherein performing the semantic analysis on the free-text description of the food product in real-time comprises causing, by the at least one computing device, the semantic analysis to performed prior to a manual submission of a form comprising the free-text description.

17. A non-transitory computer-readable medium embodying program code executable in at least one computing device that, when executed by the at least one computing device, causes the at least one computing device to at least:

generate user interface data for rendering a user interface on a client device, the user interface data comprising code that generates an event listener when the user interface is rendered on the client device that monitors a free-text description in real-time as the free-text description is provided in a text field of a form in the user interface, wherein the user interface is associated with a product review for a food product;

perform a semantic analysis on the free-text description as the free-text description is generated through the client device and prior to a submission of the form in the user interface by comparing at least one semantic obtained from the free-text description to a semantic library associated with the food product;

determine a probability that the at least one semantic obtained from the free-text description corresponds to a safety concern or a quality-related issue stored in a data store;

in response to the probability that the at least one semantic obtained from the free-text description corresponds to the safety concern or the quality-related issue, cause the user interface to display a user interface component configured to obtain a verification of the safety concern or the quality-related issue from the client device; and in response to the safety concern or quality-related issue being verified by the client device using the user interface component and a severity level associated with the safety concern or the quality-related issue exceeding a severity threshold, perform a remedial action.

18. The non-transitory computer-readable medium of claim 17, wherein the remedial action comprises removing an offering of the food product from an electronic commerce system.

19. The non-transitory computer-readable medium of claim 17, wherein:

the text field is a component of a hypertext markup language (HTML) form; and the semantic analysis is performed on the free-text description prior to a submission of the form in a browser application executable on the client device.

20. The non-transitory computer-readable medium of claim 17, wherein the event listener is implemented through asynchronous javascript and extensible markup language (AJAX).

* * * * *